United States Patent Office 3,761,282
Patented Sept. 25, 1973

3,761,282
FABRICATED ONION RING WITH DEHYDRATED POTATO SHELL
Mounir A. Shatila, Blackfoot, Idaho, assignor to American Potato Company, San Francisco, Calif.
No Drawing. Filed Oct. 21, 1971, Ser. No. 191,336
Int. Cl. A23l 1/12
U.S. Cl. 99—100 P
16 Claims

ABSTRACT OF THE DISCLOSURE

An encased onion product in any desired configuration. A process for producing an encased onion product which can be shaped in ring or other desired form. In the preferred embodiment, a starch-containing dough mixture is extruded in tubular form. A second mixture comprising onion pieces, modified starch and additives is simultaneously extruded into the hollow tubular form. The compound extrusion can be formed into rings or other configurations. The formed product can be fried directly for consumption or can be parfried, frozen, and later finish fried or reheated. Finished products have attributes not obtainable by frying coated raw onion rings or prior art fabricated onion products.

BACKGROUND OF THE INVENTION

Field of the invention

The invention relates to the production of encased onion rings and related onion products. Shell and core mixture components are simultaneously extruded to produce encased onion pieces. Formed products are deep fat fried or parfried and frozen to be finish fried or reheated before consumption.

The prior art discloses processes for dipping raw onion rings into batters and coating the dipped rings in flour prior to deep fat frying and freezing. U.S. Pat. No. 3,078,172 is representative. U.S. Pat. No. 3,114,639 discloses a process for extruding a mixture of chopped vegetables, flour, and Methocel into hot fat. Patents such as U.S. Patent No. 3,361,573 disclose processes for potato chip snacks containing small amounts of dried vegetables. Copending application Ser. No. 842,371, filed July 16, 1969, describes a process for producing a dough—the solids of which comprise a minimum of 15% by weight dehydrated onion pieces of −5 +20 mesh size—which is formed and fried.

The prior art also discloses processes where two edible components are produced independently and then combined. In U.S. Pat. No. 3,362,355, extruded doughnuts consist of two doughs of different characteristics so that the top and bottom halves are more uniform after cooking. In U.S. Pat. No. 3,450,539, pillow-shaped puffed and toasted cereal pieces are injected by needle with sirupy liquid or foam and then vacuum dried to partially fill the void center of the pillow foam.

In U.S. Pat. No. 2,858,217, dough strips are co-extruded with striping material between the strips. The composite is sliced to wafers and heated to form striped crisp flakes. In U.S. Pat. No. 3,462,276, tubes of cooked dough are puffed and dried. These tube sections are capable of being filled with edible filling, such as cheese dip, by the housewife before serving as snacks.

Prior art onion products suffer from many disadvantages. Natural onion rings vary in size, thickness, solids, and flavor. Because only the outer rings can be utilized, high wastage results. Coatings are broken loose from the ring and are often tough and greasy. The interiors are soggy and after frying, the exteriors rapidly become soggy. Fabricated products of the prior art are generally chip or snack-type products which contain small amounts of onion as a flavor and are not intended to substitute for natural onion rings.

More recently, frozen fabricated onion rings have been marketed comprising diced onions in a dough of corn flour and gums, and which are then breaded in meal and parfried before freezing. The onion flavor is subordinated by cereal. The onion pieces, each surrounded by cereal, have a mouth feel completely foreign to natural onion rings or the product of this invention. Although the rings maintain their identity during preparation, the resulting texture is undesirably leathery.

SUMMARY OF THE INVENTION

In the present invention, two separate formulations are prepared and then uniquely combined to form the novel product. One formulation comprises a dough of starchy foodstuffs, such as dehydrated instant mashed potato and potato starch. Although the ratio of dehydrated instant mashed potato and starch can be varied widely, it is preferred that from 85–95% by weight of dehydrated potato be employed, the remainder being starch. The second formulation comprises film, high solids, discrete onion pieces in a mixture of modified mongluey starch or equivalent filler with additives.

Although it will be obvious to one skilled in this art that the product of this invention can be fabricated by a number of processes, the remainder of this specification will be directed to the preferred process embodiment, i.e., simultaneous extrusion. Thus, the starchy formulation is formed in a tubular shape. Simultaneously therewith, the second formulation is extruded as a core mixture to fill the opening in the tubular starchy formulation. The combination is formed to the desired configuration, such as a ring or stick which can be directly deep fat fried to an excellent onion-ring type product or can be parfried and/or frozen until final frying or heating for consumption.

In producing a ring, a length of the combined co-extrusion can be looped to form a circle after which the ends can be joined or welded by pressure molding at the point of a slight overlap, thus forming a complete ring.

The starch-containing shell can be changed in composition, size, and thickness with no effect on the onion component. It is necessary only to form this component with a void which likewise can be of any cross sectional dimensions. For example, in the production of fabricated onion rings, a shell thickness of 3/64 to 5/64 inches with a void diameter of 1/8 to 3/8 inch has been employed satisfactorily. It will be obvious to one skilled in this art that certain care must be exercized in the combination of the shell and core mixture components. If excess core mixture is added, the shell will be distended or perhaps even ruptured. If insufficient core mixture is added, the desirable continuous ring of onion mixture will be broken and the piece integrity will be endangered. The core mixture which is added into the void is essentially discrete onion pieces preferably with a solids content appreciably above that of present market onion varieties combined with a modified starch or equivalent filler to aid extrusion. The preferred range of the modified starch in the core mixture is about 7 to 30% by weight. In addition, additives such as salt and sugar can be included as desired. The high onion solids content of the core mixture avoids the sogginess of conventional onion rings and is obtained by reconstituting one part by weight of dehydrated onion pieces with 1 to 1.5 parts by weight of water.

It will be apparent that by employing this invention, uniform rings or mixtures of ring sizes can be produced as desired with no waste of onion. This is in sharp contrast with commercially available frozen onion rings which utilize only the large outer rings of large raw onions resulting in losses of abuot 50%. Furthermore, shell dimensions of the product of the invention are not limited to the amount of coating or breading which happens to adhere as in the case of coating raw onion rings.

The moisture content of the fried product of this invention can be controlled closely by controlling the amount of rehydration water used to refreshen the onion. Although raw onions could be used or dehydrated onions could be refreshened to the moisture content of raw onions, such large quantities of water cause problems in usage. Large raw onions usually contain about 10% total solids and when coated and fried, create centers that are extremely high in moisture content. As a result, the breading or coating absorbs moisture from the centers with resulting sogginess, particularly when the rings are completely prepared and held under a heat lamp as is done in mass feeding operations. In contrast thereto, the product of this invention remains crisp under these conditions. A further advantage of the novel product of this invention resides in the fact that the core of the product of the invention shrinks very little during frying. In contrast, the onion in conventional onion rings being higher in moisture shrinks appreciably during frying, leaving a void between the onion and the coating, often resulting in complete separation when they are eaten.

By producing the shell independently, it is possible to use components which result in a finished product with the desired attributes. For example, the shell can be formulated to prevent excessive oil pickup during frying. In contrast, the coating of conventional onion rings is, by necessity, far more porous and absorbs excessive frying oil.

DESCRIPTION OF THE PREFERRED EMBODIMENT

In arriving at the preferred embodiment of this invention, many formulations were tested for both the shell and core mixture components. The shell component was satisfactory when the percentage of raw starch admixed with dehydrated instant mashed potato product ranged from 5 to 15%. Starch percentages below and above this range resulted either in shells lacking in cohesiveness or in excessively greasy end products. Although several types of raw starches worked satisfactorily in the above range, potato starch was preferred because of its mild flavor. All types of dehydrated instant potato products such as potato flakes, potato agglomerates, or Potato Buds gave satisfactory results but potato granules were preferred. A binder, such as raw starch, must be incorporated with such products because they consist essentially of intact potato cells which have very little adhesive quality when formed into a dough with hot or cold water. It would be obvious to one skilled in this art that other dehydrated potato products such as potato flour or ground diced or sliced potatoes could be used. The amount of raw starch required would be reduced or eliminated because these products already contain appreciable amounts of free starch in contrast to the dehydrated instant mashed potato products which are essentially intact potato cells. Alternatively, sufficient binding starch could also be supplied by grinding dehydrated instant mashed potato products such as potato flakes to liberate starch from potato cells. However, when raw starch is employed in the formulation, hot water in the temperature range of 180° F. to boiling was required to form a suitable dough. Temperatures below 180° F. did not swell the raw starch satisfactorily. One skilled in this art appreciates that in shell formulations in which previously gelatinized starch supplies the binding action, hot water would not be required. The most satisfactory doughs used in forming the shell component were in the moisture range of 55–75%.

Various core mixture components were found to give satisfactory results. For example, both Amylaise VII, a modified starch sold by American Maize Company and Textaid, a modified starch sold by National Starch and Chemical Corporation, gave excellent results. Other starchy fillers, such as dehydrated mashed potato products, could also be used.

The percentage of salt and sugar, in the core mixture, can be varied to met any taste requirement. In general, a sugar level in the range of 1–5% by weight and salt in the range of 0.3–1.0% by weight of the core mixture were satisfactory.

The percentage of onion in the core mixture component can be varied to provide the level of onion flavor desired. Satisfactory products were made varying this component from 10 to 80% by weight of the core mixture, 50 to 80% being the preferred range. The amount of onion used would also be dependent upon the strength of the dehydrated product, as well as the level of onion flavor desired. Test mixtures employing reconstituted domestic dehydrated onions made from special pungent white varieties were preferred.

When dehydrated onion pieces are employed, the amount of water used in reconstituting can be varied to give the desired finished texture. In commercially available frozen onion rings, the onion component is about 90% moisture prior to frying. This level is far above that of any satisfactory coating or breading. In contrast, when employing dehydrated onions in producing the product of this invention, the preferred moisture level of the reconstituted onions is reached by using 1 to 1½ parts by weight water to each part by weight dehydrated onion. This results in a moisture content of the refreshened onion of about 50–60%, and onion solids of 40–50%. This level of onion solids is 4 to 5 times the solid content of the average market onion used in making commercial onion rings and allows the product of this invention to be fried to a crispy interior without overfrying the shell. The core mixture has a preferred moisture range of 40 to 60% by weight. This factor is undoubtedly largely responsible for the improved texture and mouth feel of the product of the invention as contrasted to commercial onion rings.

EXAMPLE

Component A (shell)

A mixture of 90% by weight commercial potato granules and 10% raw potato starch was mixed with hot water—approximately 32 parts by weight potato starch mix and 68 parts by weight hot water at about 190° F. to form a cohesive dough of about 70% moisture content.

Component B (core mixture)

Dehydrated ¼ inch diced onion pieces were reconstituted with water using a ratio of 1 part by weight onion to 1.4 parts by weight water. To the reconstituted onion was added a water mixture of Textaid, a modified starch sold by National Starch and Chemical Corporation, sucrose, and salt to make a core mixture of the following composition:

|  | Percent |
| --- | --- |
| Textaid | 7.0 |
| Sucrose | 3.0 |
| Salt | 0.3 |
| Reconstituted onion | 71.8 |
| Water | 17.9 |
|  | 100.0 |

By calculation the above core mixture has a moisture content of about 60%.

The shell component A was extruded in hollow tubular form with a shell thickness of approximately ³⁄₆₄–⁵⁄₆₄ inch and with a central void of about ¼ inch in diameter. Simultaneously, by co-extrusion, component B was added to fill the central void of component A completely with no distortion. The combined co-extrusion was cut in lengths of about 5 to 10 inches, looped, and the ends "welded" to form a continuous circular ring. Other lengths were left in stick form. The formed pieces were then parfried in oil at 300–350° F. for 40–60 seconds, frozen and packaged. After frozen storage, the parfried product was either finish fried in deep fat at 350° F. for 1 to 1½ minutes or baked in an oven at 450° F. for 10 minutes. The finished product was crisp throughout, onion-like and free from sogginess or gumminess. The fried product was held under a standard restaurant heat lamp for 15 to 30 minutes, after which the product was still crisp and excellent in flavor and mouth feel. The finished product of this example was uniformly golden brown in color, had a moisture content of 40 to 50% and a fat content of 5 to 20%. In contrast thereto, commercially available frozen onion rings purchased at the local supermarket were found to be greasy. The fat content when prepared according to package directions was 15 to 50%.

Many advantages of the invention are apparent. Rings or other shapes of the product of the invention can be varied in size, shell thickness, core thickness, moisture content of core mixture, onion flavor, texture of both components, oil absorption, and the like. This invention is a significant advance in the art. Superior new products can be produced more economically. The products of this invention are not only an adequate replacement for commercial frozen onion rings or the like, but have attributes not obtainable by conventional commercial onion ring processes or other onion processes of the prior art.

What is claimed is:

1. A fabricated onion product consisting of an independent outer shell component about 3/64 to 5/64 inch in thickness and a void diameter of about 1/8 to 3/8 inch and comprising about 85–95% by weight of solids as dehydrated instant mashed potato product and about 15–5% starch binder surrounding an independent tubular-shaped core mixture component comprising about 50 to 80% by weight reconstituted onion pieces and about 10 to 30% by weight non-sticky starch.

2. The product of claim 1 in which said dehydrated instant mashed potato product is selected from a group consisting of potato granules, potato flakes, and potato agglomerates and said starch binder is free starch.

3. The product of claim 2 in which said core mixture component has a moisture content in the range of 40 to 60% by weight and comprises about 50 to 80% by weight of reconstituted onion pieces about 10 to 30% by weight non-sticky starch, 0.3 to 1.0% salt and 1 to 5% sugar.

4. The product of claim 1 in which said dehydrated instant mashed potato product comprises ground dehydrated potato products and said binder comprises, at least in part, free starch from said ground products.

5. The product of claim 1 further characterized by being parfried and frozen and having a ring form.

6. In a process for producing fabricated onion products suitable for frying comprising the steps of:
    (a) forming a first component of cohesive dough having a moisture content in the range of 55–75% the solids of said cohesive dough comprising 85 to 95% by weight dehydrated instant mashed potato product and 5–15% by weight starch binder;
    (b) forming a second component which is an extrudable mixture of 40 to 60% moisture content comprising 50–80% by weight discrete high solids onion pieces produced by rehydrating about 1 part by weight dehyrated onion pieces in about 1½ parts by weight water and starchy foodstuff;
    (c) combining said first component and said second component in strips in such a manner that both components retain their original identity and a tubular-shaped core of said second component is surrounded by a shell of said first component; and
    (d) dividing said strips into desired lengths.

7. The process as recited in claim 6 further characterized by the additional processing steps of connecting the opposite ends of said lengths to form a ring and parfrying, then freezing said ring.

8. The process as recited in claim 6 in which said combining step comprises extruding said first component in tubular form and simultaneously extruding said second component to fill the void of said tubular form.

9. The process as recited in claim 6 wherein said dehydrated potato is selected from a group of dehydrated instant mashed potato products consisting of potato granules, potato flakes, and potato agglomerates and said starch is raw starch.

10. The process as recited in claim 6 wherein said starch binder is raw starch, and said raw starch is swollen in the production of said dough by mixing with hot water.

11. The process as recited in claim 6 in which said extrudable mixture contains about 10 to 30% by weight non-sticky starch, about .3 to 1.0% by weight salt, and about 1 to 5% by weight sugar.

12. The process as recited in claim 7 wherein said parfrying is in oil for about 40 to 60 seconds at a temperature of about 300 to 350° F. and said parfried frozen ring is subsequently finish heated to produce an onion ring for consumption.

13. The process as recited in claim 6 wherein said binder comprises, at least in part, free starch from ground said dehydrated instant mashed potato product.

14. The process as recited in claim 6 wherein said onion pieces are 10–80% by weight of said second component.

15. The process as recited in claim 6 in which said second component comprises by weight:

| | Percent |
|---|---|
| Modified starch | 7.0 |
| Sucrose | 3.0 |
| Salt | 0.3 |
| Reconstituted onion | 71.8 |
| Water | 17.9 | said reconstituted onion ingredient comprising about 1 part by weight dehydrated onion and about 1.4 parts by weight water.

16. The product of claim 1 in which said non-sticky starch is modified starch or dehydrated mashed potato products.

References Cited
UNITED STATES PATENTS

| | | | |
|---|---|---|---|
| 3,615,675 | 10/1971 | Wisdom et al. | 99—83 |
| 3,650,765 | 3/1972 | Smadar et al. | 99—100 R |
| 3,600,193 | 8/1971 | Glabe et al. | 99—83 |
| 3,650,766 | 3/1972 | Smadar et al. | 99—100 R |
| 3,208,851 | 9/1965 | Antinori | 99—100 |
| 3,687,679 | 8/1972 | Sijbring | 99—100 P |
| 3,462,276 | 8/1969 | Benson | 99—83 |

NORMAN YUDKOFF, Primary Examiner

C. P. RIBANDO, Assistant Examiner

U.S. Cl. X.R.

99—100 R, 207